United States Patent
Zhang et al.

(10) Patent No.: US 12,445,689 B2
(45) Date of Patent: Oct. 14, 2025

(54) BULLET-SCREEN COMMENT DATA PROCESSING

(71) Applicant: SHANGHAI BILIBILI TECHNOLOGY CO., LTD., Shanghai (CN)

(72) Inventors: Xuedong Zhang, Shanghai (CN); Guojia Chen, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/465,087

(22) Filed: Sep. 11, 2023

(65) Prior Publication Data

US 2024/0214643 A1 Jun. 27, 2024

(30) Foreign Application Priority Data

Dec. 22, 2022 (CN) .......................... 202211653880.3

(51) Int. Cl.
*H04N 21/4788* (2011.01)
*H04N 21/472* (2011.01)

(52) U.S. Cl.
CPC ... *H04N 21/4788* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 8,327,395 B2 * | 12/2012 | Lee | ........................ | H04H 60/64 |
| | | | | 725/12 |
| 8,655,953 B2 * | 2/2014 | Kandekar | .......... | H04N 7/17318 |
| | | | | 709/200 |
| 8,745,647 B1 * | 6/2014 | Shin | ..................... | H04N 21/442 |
| | | | | 725/9 |
| 9,736,503 B1 * | 8/2017 | Bakshi | ............. | H04N 21/23424 |

(Continued)

FOREIGN PATENT DOCUMENTS

| | | |
|---|---|---|
| CN | 105959811 A | 9/2016 |
| CN | 109413484 A | 3/2019 |

(Continued)

OTHER PUBLICATIONS

First Office Action of the counterpart CN application No. 202211653880. 3, Official mailing date: Nov. 29, 2024, 9 pages.

*Primary Examiner* — An Son P Huynh
(74) *Attorney, Agent, or Firm* — FisherBroyles LLP (57) ABSTRACT

A bullet-screen comment data processing method is provided. The method includes: receiving bullet-screen comment data for an on-demand video played in a client; in response to determining that the on-demand video meets a preset bullet-screen comment trigger condition, screening the bullet-screen comment data based on a preset rule to obtain source bullet-screen comments; combining the source bullet-screen comments to generate collapsed bullet-screen comments representing homogenous bullet-screen comments, and sorting the collapsed bullet-screen comments to obtain a sorting result; and sending the collapsed bullet-screen comments to the client based on the sorting result, to display the collapsed bullet-screen comments on a display screen of the client.

18 Claims, 5 Drawing Sheets

(56) References Cited

U.S. PATENT DOCUMENTS

| | | | |
|---|---|---|---|
| 10,419,790 B2* | 9/2019 | Gersten | H04N 21/454 |
| 12,096,086 B2* | 9/2024 | Zang | H04N 21/4884 |
| 2002/0056087 A1* | 5/2002 | Berezowski | H04N 21/488 |
| | | | 348/E7.071 |
| 2005/0149964 A1* | 7/2005 | Thomas | H04N 21/442 |
| | | | 348/E7.071 |
| 2007/0136753 A1* | 6/2007 | Bovenschulte | H04N 7/17318 |
| | | | 348/E7.071 |
| 2010/0251295 A1* | 9/2010 | Amento | H04N 21/485 |
| | | | 725/38 |
| 2012/0137316 A1* | 5/2012 | Elizarov | H04N 21/24 |
| | | | 725/9 |
| 2014/0068692 A1* | 3/2014 | Archibong | H04N 21/6334 |
| | | | 725/116 |
| 2014/0081954 A1* | 3/2014 | Elizarov | G06F 16/9536 |
| | | | 707/722 |
| 2016/0037217 A1* | 2/2016 | Harmon | H04N 21/4542 |
| | | | 725/9 |
| 2017/0006322 A1* | 1/2017 | Dury | H04N 21/254 |
| 2017/0126641 A1* | 5/2017 | Thomas | H04L 65/612 |
| 2017/0127104 A1* | 5/2017 | Thomas | H04N 21/2407 |
| 2017/0289634 A1* | 10/2017 | E | H04N 21/4532 |
| 2018/0255346 A1* | 9/2018 | Guo | H04N 21/4858 |
| 2019/0191209 A1* | 6/2019 | Harb | H04N 21/4825 |
| 2020/0260137 A1* | 8/2020 | Chen | H04N 21/47217 |
| 2020/0312375 A1* | 10/2020 | Xu | G11B 27/34 |
| 2021/0019369 A1* | 1/2021 | Sharma | G06F 40/263 |
| 2021/0120319 A1* | 4/2021 | Zhou | H04N 21/43074 |
| 2021/0185386 A1* | 6/2021 | Kong | H04N 21/4394 |
| 2022/0020045 A1* | 1/2022 | Guney | G06F 3/04817 |
| 2022/0385996 A1* | 12/2022 | Lan | H04L 65/613 |
| 2023/0004593 A1* | 1/2023 | Chen | H04N 21/4788 |
| 2023/0073859 A1* | 3/2023 | Matthews | G06Q 30/0641 |
| 2023/0267894 A1* | 8/2023 | Su | H04N 21/4312 |
| | | | 345/629 |
| 2023/0283861 A1* | 9/2023 | Taylor | H04N 21/854 |
| | | | 725/61 |
| 2023/0326115 A1* | 10/2023 | Xiao | H04N 21/431 |
| | | | 345/473 |

FOREIGN PATENT DOCUMENTS

| | | |
|---|---|---|
| CN | 114615538 A | 6/2022 |
| WO | 2022022196 A1 | 2/2022 |

* cited by examiner

| Bullet-screen comment text | Quantity of times | Start moment (s) | End moment (s) |
|---|---|---|---|
| Zuo Hang hold the ticket tightly! We will definitely win. | 37 | 0 | 10 |
| Prohibit any form of explosion-proof pressure on the left side of the upper circle. | 24 | 0 | 10 |
| Zhang Ji hold the ticket tightly and debuted at a high position. | 19 | 0 | 10 |
| Zuo Hang hold the ticket tightly! We will definitely win. | 41 | 10 | 20 |
| Mu Zhicheng hold the ticket tightly. | 23 | 10 | 20 |
| Zhang Junhao hold the ticket tightly. | 21 | 10 | 20 |
| Zuo Hang hold the ticket tightly! We will definitely win. | 35 | 20 | 30 |
| Zhang Zeyu hold the ticket tightly. | 25 | 20 | 30 |
| Mu Zhicheng hold the ticket tightly. | 23 | 20 | 30 |
| Zuo Hang hold the ticket tightly! We will definitely win. | 39 | 30 | 40 |
| Su Xinhao hold the ticket tightly and debuted at a high position. | 19 | 30 | 40 |
| Mu Zhicheng hold the ticket tightly. | 19 | 30 | 40 |
| Zuo Hang hold the ticket tightly! We will definitely win. | 30 | 40 | 50 |
| Prohibit any form of explosion-proof pressure on the left side of the upper circle. | 17 | 40 | 50 |
| Su Xinhao hold the ticket tightly and debuted at a high position. | 16 | 40 | 50 |
| Zuo Hanghao hold the ticket tightly and debuted at a high position. | 22 | 50 | 60 |
| Zhang Ji debuted at a high position. | 19 | 50 | 60 |
| Zuo Hang hold the ticket tightly! We will definitely win. | 18 | 50 | 60 |
| Prohibit any form of explosion-proof pressure on the left side of the upper circle. | 28 | 60 | 70 |
| Zhang Ji debuted at a high position. | 20 | 60 | 70 |
| Zhang Junhao hold the ticket tightly. | 20 | 60 | 70 |
| Prohibit any form of explosion-proof pressure on the left side of the upper circle. | 25 | 70 | 80 |
| Zuo Hang hold the ticket tightly! We will definitely win. | 20 | 70 | 80 |
| Mu Zhicheng hold the ticket tightly. | 19 | 70 | 80 |
| Prohibit any form of explosion-proof pressure on the left side of the upper circle. | 40 | 80 | 90 |
| Zhang Zeyu debuted at a high position. | 17 | 80 | 90 |
| Zhang Zeyu hold the ticket tightly. | 17 | 80 | 90 |
| Prohibit any form of explosion-proof pressure on the left side of the upper circle. | 35 | 90 | 100 |
| Zhang Junhao hold the ticket tightly. | 21 | 90 | 100 |

BULLET-SCREEN COMMENT DATA PROCESSING

CROSS-REFERENCE TO RELATED APPLICATIONS

This application claims priority to Chinese Patent Application No. 202211653880.3, filed on Dec. 22, 2022, the contents of which are hereby incorporated by reference in their entirety for all purposes.

TECHNICAL FIELD

Embodiments of this application relate to the field of multimedia network technologies, and in particular, to a bullet-screen comment data processing method and system, a computer device, and a computer-readable storage medium.

BACKGROUND

Currently, in an on-demand video, there are a large quantity of repeated positive and neutral screen-flooding bullet-screen comments in some time periods. These bullet-screen comments have a specific interactive function and atmospheric function, and can improve viewing experience of users.

SUMMARY

Some embodiments of this application provide a bullet-screen comment data processing method, a computer device, and a non-transitory computer-readable storage medium.

According to an aspect of embodiments of this application, a bullet-screen comment data processing method is provided, and includes:

receiving bullet-screen comment data for an on-demand video played in a client;

when the on-demand video meets a preset bullet-screen comment trigger condition, screening the bullet-screen comment data based on a preset rule, to obtain source bullet-screen comments;

combining the source bullet-screen comments to generate collapsed bullet-screen comments used to represent homogenous bullet-screen comments, and sorting the collapsed bullet-screen comments to obtain a sorting result; and sending the collapsed bullet-screen comments to the client based on the sorting result, to display the collapsed bullet-screen comments on a display screen of the client.

According to an aspect of embodiments of this application, a computer device is further provided. The computer device includes a processor and a memory storing computer programs executable on the processor that, when executed by the processor, cause the processor to implement the steps of the bullet-screen comment data processing method.

According to an aspect of embodiments of this application, a non-transitory computer-readable storage medium is further provided. The computer-readable storage medium stores a computer program that, when executed by at least one processor, cause the at least one processor to implement the steps of the bullet-screen comment data processing method.

BRIEF DESCRIPTION OF DRAWINGS

FIG. 3 is an example of a schematic diagram of sorting result data according to some embodiments of this application;

DESCRIPTION OF EMBODIMENTS

To make the objectives, technical solutions, and advantages of this application clearer and more comprehensible, the following further describes this application in detail with reference to the accompanying drawings and embodiments. It should be understood that the embodiments described herein are merely used to explain this application but are not intended to limit this application. All other embodiments obtained by a person of ordinary skill in the art based on the embodiments of this application without creative efforts shall fall within the protection scope of this application.

It should be noted that the descriptions such as "first" and "second" in the embodiments of this application are merely used for description, and shall not be understood as an indication or implication of relative importance or an implicit indication of a quantity of indicated technical features. Therefore, a feature limited by "first" or "second" may explicitly or implicitly include at least one feature. In addition, the technical solutions in the embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

Currently, in an on-demand video, there are a large quantity of repeated positive and neutral screen-flooding bullet-screen comments in some time periods. These bullet-screen comments have a specific interactive function and atmospheric function, and can improve viewing experience of users. However, an excessively large quantity of screen-flooding bullet-screen comments affect diversity of bullet-screen comment content on a display screen, causing aversion of some users. Therefore, on the basis of retaining the interactive function and atmospheric function of the bullet-screen comments and a feature of the video to a maximum extent, the screen-flooding bullet-screen comments of users need to be effectively guided and displayed, to avoid a case in which the screen-flooding bullet-screen comments occupy a relatively large quantity of areas on the display screen.

In the conventional technology, a large quantity of screen-flooding bullet-screen comments are processed in a live streaming scenario, for example, a trend following bullet-screen comment and a marquee bullet-screen comment. However, such a technology has significant scenario limitations. Because the on-demand video is fundamentally greatly different from the live streaming scenario, the technology cannot be directly migrated and used. In addition, the bullet-screen comment in the live streaming scenario is not stored, has no complex state, and does not involve dynamic elimination of the bullet-screen comment. Therefore, the trend following bullet-screen comment and the marquee bullet-screen comment can be implemented by using an existing component. However, a bullet-screen comment in an on-demand scenario needs to be stored, and involves a complex state change. In addition, a hot video has features of a long period, a large quantity of visits, and intelligent recommendation of a bullet-screen comment.

Therefore, to meet these conditions, a complete, efficient, and systematic technical solution is required for generation, storage, delivery, and interaction of a collapsed bullet-screen comment in an on-demand video scenario.

In view of this, this application is intended to provide a bullet-screen comment data processing solution in which bullet-screen comment data for an on-demand video played in a client is received; when the on-demand video meets a preset bullet-screen comment trigger condition, the bullet-screen comment data is screened based on a preset rule, to obtain source bullet-screen comments; the source bullet-screen comments are combined to generate collapsed bullet-screen comments used to represent homogenous bullet-screen comments, and the collapsed bullet-screen comments are sorted to obtain a sorting result; and the collapsed bullet-screen comments are sent to the client based on the sorting result, to display the collapsed bullet-screen comments on a display screen of the client. A large quantity of homogenous screen-flooding bullet-screen comments obtained through screening are combined, and only the collapsed bullet-screen comments generated after the combination are displayed on the client, to avoid a case in which the screen-flooding bullet-screen comments occupy a relatively large quantity of areas on the display screen, and consequently viewing experience of a user is affected.

This application provides a plurality of embodiments for further describing the bullet-screen comment data processing solution. For details, refer to the following descriptions.

In the descriptions of this application, it should be understood that numerical symbols before steps do not indicate an order of performing the steps, but are merely used to facilitate description of this application and differentiation of each step, and therefore cannot be construed as a limitation on this application.

The following provides an explanation of the terms in this application:

Collapsed bullet-screen comment: The collapsed bullet-screen comment is a special bullet-screen comment that is calculated and generated based on a common bullet-screen comment and that is used to represent homogenous content, is presented in a new form on a display side, and is not sent by a user. Collapsed bullet-screen comments in a same video are dynamic.

Homogeneous bullet-screen comments: The homogeneous bullet-screen comments are a large quantity of positive and neutral bullet-screen comments with similar bullet-screen comment content texts and same meanings.

Figure 1:
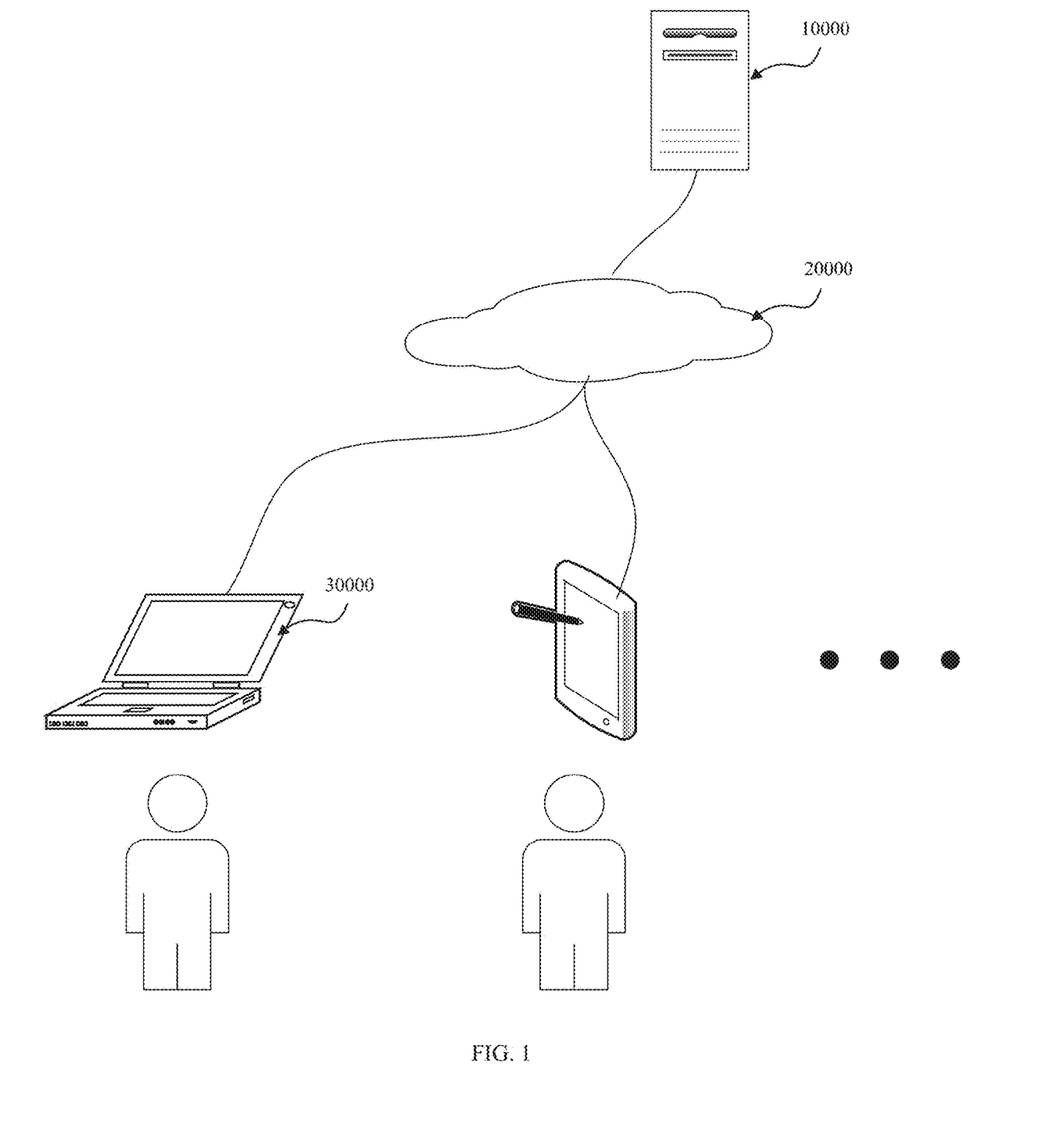
FIG. 1 is an example of a diagram of an application environment of a bullet-screen comment data processing method according to some embodiments of this application.

FIG. 1 is an example of a schematic diagram of an environmental application according to some embodiments of this application. As shown in FIG. 1, a computer device 10000 may be connected to a client 30000 by using a network 20000.

The computer device 10000 may provide a service, for example, perform network debugging, or return bullet-screen comment data processing result data to the client 30000.

The computer device 10000 may be located in a data center such as a single site, or may be distributed at different geographic locations (for example, in a plurality of sites). The computer device 10000 may provide a service by using one or more networks 20000. The network 20000 includes various network devices, for example, a router, a switch, a multiplexer, a hub, a modem, a bridge, a repeater, a firewall, and/or a proxy device. The network 20000 may include a physical link, for example, a coaxial cable link, a twisted-pair cable link, an optical fiber link, or a combination thereof. The network 20000 may include a radio link, for example, a cellular link, a satellite link, or a Wi-Fi link.

The computer device 10000 may be implemented by one or more computing nodes. The one or more computing nodes may include virtualized computing instances. The virtualized computing instance may include a virtual machine such as simulation of a computer system, an operating system, or a server. The computing node may load the virtual machine based on a virtual image and/or other data that defines specific software (for example, an operating system, a dedicated application program, or a server) for simulation. As requirements for different types of processing services change, different virtual machines may be loaded and/or terminated on the one or more computing nodes. A management program may be implemented to manage use of different virtual machines on a same computing node.

The client 30000 may be configured to access content and a service of the computer device 10000. The client 30000 may include any type of electronic device, for example, a mobile device, a tablet device, a laptop computer, a workstation, a virtual reality device, a game device, a set-top box, a digital streaming device, a vehicle terminal, or a smart television.

The client 30000 may output (for example, display, render, or present) the bullet-screen comment data processing result data or the like to a user.

The following describes a network debugging solution in a plurality of embodiments. The solution may be implemented by using the computer device 10000.

Figure 2:
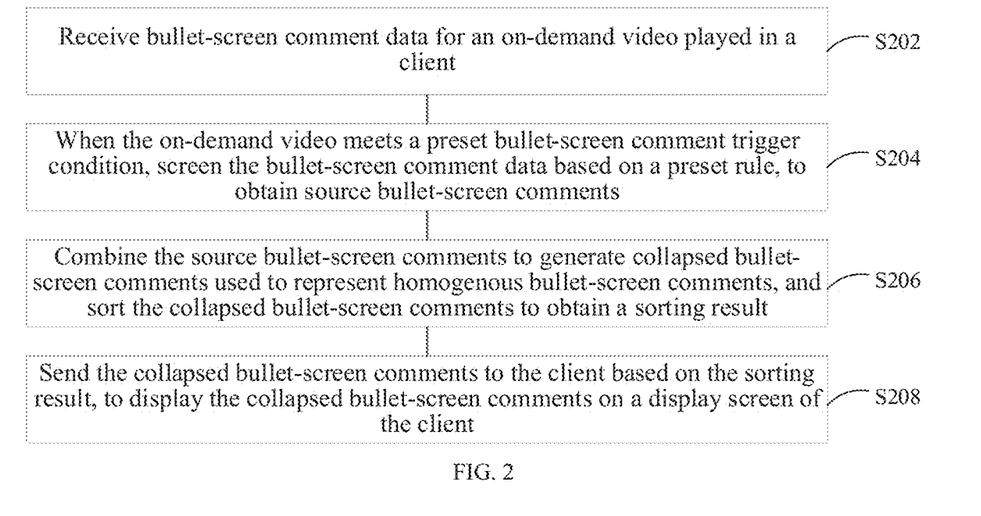
FIG. 2 is an example of a flowchart of a bullet-screen comment data processing method according to some embodiments of this application.

FIG. 2 is an example of a flowchart of a bullet-screen comment data processing method according to some embodiments of this application. Steps S202-S208 are included.

Step S202: Receive bullet-screen comment data for an on-demand video played in a client. In this embodiment, the client may provide a bullet-screen comment interaction function. When viewing the on-demand video by using the client, a user may send the bullet-screen comment data for the on-demand video, to interact with another user. The client has a user data collection means, obtains, by using the user data collection means, the bullet-screen comment data entered by the user, and reports the bullet-screen comment data to a server.

Step S204: When the on-demand video played in the client meets a preset bullet-screen comment trigger condition, screen the bullet-screen comment data based on a preset rule, to obtain source bullet-screen comments.

In this embodiment, a collapsed state trigger control mechanism is set. When the on-demand video is played in the client, it is determined whether the on-demand video played in the client meets the preset bullet-screen comment trigger condition. When the on-demand video played in the client meets the preset bullet-screen comment trigger condition, the received bullet-screen comment data is screened based on the preset rule, to combine source data obtained through screening.

The preset bullet-screen comment trigger condition is a preset collapsed bullet-screen comment trigger condition, and includes a plurality of trigger dimensions such as a video partition dimension, a video whitelist dimension, and a dimension of infrequent generation in a long tail period. The video partition dimension means that a system partitions different on-demand videos. For example, there is a level-1 partition and a level-2 partition. It is assumed that the current system is configured to perform collapsed bullet-screen comment trigger control only on a video in the level-2 partition. In this case, only when the on-demand video played in the client falls into the level-2 partition, generation of a collapsed bullet-screen comment is triggered. The video whitelist dimension means that the system maintains a whitelist of videos that can use the collapsed bullet-screen comment, and only when the on-demand video played in the client falls into the whitelist, generation of the collapsed bullet-screen comment is triggered. The dimension of infrequent generation in a long tail period means that a quantity of current viewers corresponding to a single on-demand video is limited, and only when the quantity of current viewers reaches a preset quantity of viewers, generation of the collapsed bullet-screen comment is triggered. Popularity of some hot videos decreases after a period of time. Therefore, in this case, trigger control may be performed based on the quantity of current viewers, and a collapsed bullet-screen comment calculation process is not frequently performed.

In this embodiment, the preset rule is set, and the bullet-screen comment data is screened based on the preset rule, to obtain the source bullet-screen comments. The source bullet-screen comments are some bullet-screen comment data that can be collapsed for display.

In some embodiments of this application, the preset rule is used to obtain, through screening, bullet-screen comment data that meets a collapsed bullet-screen comment generation condition, and the preset rule includes: A length of the bullet-screen comment data is less than or equal to a third preset value; the bullet-screen comment data does not have a specified label; and the bullet-screen comment data cannot trigger an emoticon bullet-screen comment.

The third preset value is a preset maximum value of a length of the collapsed bullet-screen comment, that is, in this embodiment, excessively long bullet-screen comment data is not involved in collapsed calculation. A threshold may be set for a length of each of a Chinese character and a length of an English character. For example, it is set that there are 20 Chinese characters and 60 English characters.

The specified label is a preset data label, and bullet-screen comment data with the specified label is not involved in calculation or generation of the collapsed bullet-screen comment. The data label may be a label actively added by an administrator, or may be a label automatically added by the system. In an example, the specified label may include a highly liked bullet-screen comment label, a protected bullet-screen comment label, an NFT bullet-screen comment label, and an uploader bullet-screen comment label. The highly liked bullet-screen comment label and the protected bullet-screen comment label may be labels actively added by the administrator, and the NFT bullet-screen comment label and the uploader bullet-screen comment label may be labels automatically added by the system. The NFT bullet-screen comment label is a label added to bullet-screen comment data sent by some users who have purchased a preset digital collection. The uploader bullet-screen comment label is a label added to bullet-screen comment data sent by some uploaders.

In addition, some bullet-screen comment data that can trigger an emoticon bullet-screen comment special effect is not involved in calculation of collapsed bullet-screen comment data either, so that this type of bullet-screen comment data can be directly displayed and the emoticon bullet-screen comment special effect can be triggered, to enhance an atmosphere of viewing the on-demand video by the user. In an exemplary implementation, content review may be further performed on the bullet-screen comment data, and bullet-screen comment data that does not pass the review is not involved in calculation of the collapsed bullet-screen comment data either, to screen out some illegal bullet-screen comment data or bullet-screen comment data that includes sensitive content.

Step S206: Combine the source bullet-screen comments to generate collapsed bullet-screen comments used to represent homogenous bullet-screen comments, and sort the collapsed bullet-screen comments to obtain a sorting result.

In this embodiment, the source bullet-screen comments that meet the preset rule are combined to generate the collapsed bullet-screen comments used to represent the homogenous bullet-screen comments. Calculation may be performed on the basis of a time period (for example, 1 minute). A quantity of pieces of bullet-screen comment data with same content or being substantially the same in a single time period is counted, the bullet-screen comment data with same content or being substantially the same is combined into one bullet-screen comment, and the counted quantity is configured as a count corresponding to the bullet-screen comment.

After the collapsed bullet-screen comments are generated, the collapsed bullet-screen comments may be further sorted in a reverse order (in descending order of counts) based on a count of each collapsed bullet-screen comment, to obtain the sorting result. In an exemplary implementation, due to a limitation of a size of a display screen of the client, all collapsed bullet-screen comments cannot be simultaneously displayed, and it may be further set that a preset quantity (for example, 10) of collapsed bullet-screen comments with high rankings are valid data.

Step S208: Send the collapsed bullet-screen comments to the client based on the sorting result, to display the collapsed bullet-screen comments on the display screen of the client.

Due to a limitation of the size of the display screen of the client, to avoid a case in which the bullet-screen comment blocks a relatively large amount of content in a picture, there may be a limitation that a preset quantity of collapsed bullet-screen comments, for example, three or four collapsed bullet-screen comments, are displayed on the screen of the client at a time. When the server delivers the collapsed bullet-screen comment to the client, it is also set that N collapsed bullet-screen comments, for example, four collapsed bullet-screen comments, are delivered at an interval of a preset period. When displaying the collapsed bullet-screen comment, the client may display different quantities of collapsed bullet-screen comments based on the size of the display screen. For example, if the display screen is relatively large, four bullet-screen comments may be displayed; or if the display screen of the client is relatively small, two or three bullet-screen comments may be displayed.

The following provides several optional embodiments to optimize the bullet-screen comment data processing method. Details are as follows:

In some embodiments of this application, after step S202, the method may further include the following steps:

obtaining playback data corresponding to the on-demand video, where the playback data includes a total quantity of on-demand views and a total quantity of bullet-screen comments; if the total quantity of on-demand views is greater than a first preset value, and/or the total quantity of bullet-screen comments is greater than a second preset value, determining that the on-demand video is a hot video, and when the on-demand video is a hot video, detecting whether the on-demand video meets the preset bullet-screen comment trigger condition.

In this embodiment, it may be set that the collapsed bullet-screen comment exists only in the hot video. The playback data corresponding to the on-demand video is obtained, it is determined, based on the playback data corresponding to the on-demand video, whether the on-demand video played in the client is a hot video, and then subsequent collapsed bullet-screen comment trigger control is performed on the hot video.

The playback data may include the total quantity of on-demand views and the total quantity of bullet-screen comments. If the total quantity of on-demand views is greater than the first preset value, and/or the total quantity of bullet-screen comments is greater than the second preset value, it is determined that the on-demand video is a hot video. When the on-demand video is a hot video, it is detected whether the on-demand video meets the preset bullet-screen comment trigger condition. The first preset value is a preset minimum value of a total quantity of views. If the total quantity of on-demand views of the on-demand video is greater than the first preset value, it may be determined that the on-demand video is a hot video. The second preset value is a preset minimum value of the total quantity of bullet-screen comments. If the total quantity of bullet-screen comments of the on-demand video is greater than the second preset value, it may be determined that the on-demand video is a hot video.

In some embodiments of this application, step S206 may include the following steps:

counting a first quantity of homogeneous bullet-screen comments included in each collapsed bullet-screen comment; and when the first quantity is greater than or equal to a fourth preset value, sorting the collapsed bullet-screen comments in a reverse order based on the first quantity, and retaining a preset quantity of collapsed bullet-screen comments with high rankings, to obtain the sorting result.

In this embodiment, the first quantity of homogenous bullet-screen comments included in each collapsed bullet-screen comment is counted and compared with the fourth preset value, and when the first quantity is greater than or equal to the preset value, the collapsed bullet-screen comments are sorted in the reverse order (that is, in descending order) based on the first quantity, and the preset quantity of collapsed bullet-screen comments with high rankings are retained, to obtain the sorting result. The preset quantity is a preset quantity threshold of valid bullet-screen comments. For example, if the preset quantity is 10, 10 collapsed bullet-screen comments with high rankings are retained as valid data.

In some embodiments of this application, the method further includes:

storing the collapsed bullet-screen comment based on a video granularity; or storing the collapsed bullet-screen comment based on a video segment granularity.

In this embodiment, the collapsed bullet-screen comment may be stored based on two granularities: the video granularity and the video segment granularity. The storage based on the video granularity is performed for delivery to the client for display. The segment granularity is applied to scenarios with a query requirement. The storage based on the video granularity is storage for all collapsed bullet-screen comments in a single on-demand video. The storage based on the video segment granularity means that an on-demand video is divided into a plurality of segments, and a corresponding collapsed bullet-screen comment is stored for each independent segment, where X seconds may be used as a basic unit during division into segments.

In some embodiments of this application, the method may further include the following steps: obtaining a generation state of the collapsed bullet-screen comment; and updating the collapsed bullet-screen comment based on the generation state of the collapsed bullet-screen comment.

In this embodiment, after the collapsed bullet-screen comment of the on-demand video is stored, a user viewing the on-demand video sends new bullet-screen comment data over time. In this case, the generation state of the collapsed bullet-screen comment is obtained, to update the collapsed bullet-screen comment based on the generation state of the collapsed bullet-screen comment. The generation state of the collapsed bullet-screen comment may include two types: a change update state and a full update state. A scenario involved in full update includes generation of a collapsed bullet-screen comment of a historical video, no collapsed bullet-screen comment in a current video, and setting by the administrator. Change update: Change update is used in cases other than the foregoing cases, that is, collapsed bullet-screen comment data of a video segment in which a bullet-screen comment newly sent by the user is located is updated.

In some embodiments of this application, the updating the collapsed bullet-screen comment based on the generation state of the collapsed bullet-screen comment includes:

when the generation state of the collapsed bullet-screen comment is change update, determining, based on a generation time corresponding to the collapsed bullet-screen comment that needs to be updated, a target video segment to which the collapsed bullet-screen comment that needs to be updated belongs, and recalculating a collapsed bullet-screen comment in the target video segment, to update the collapsed bullet-screen comment corresponding to the target video segment; or when the generation state of the collapsed bullet-screen comment is full update, updating collapsed bullet-screen comments corresponding to all video segments in the on-demand video.

In this embodiment, when the generation state of the collapsed bullet-screen comment is change update, the target video segment to which the collapsed bullet-screen comment that needs to be updated belongs is determined based on the generation time corresponding to the collapsed bullet-screen comment that needs to be updated, and the collapsed bullet-screen comment in the target video segment is recalculated, to update the collapsed bullet-screen comment corresponding to the target video segment, or when the generation state of the collapsed bullet-screen comment is full update, the collapsed bullet-screen comments corresponding to all the video segments in the on-demand video are updated.

In some embodiments of this application, step S208 may include the following step:

delivering a preset quantity of collapsed bullet-screen comments to the client based on a preset period and the sorting result In this embodiment, when delivering the collapsed bullet-screen comment to the client, the server delivers only the preset quantity of collapsed bullet-screen comments at a time, to avoid a case in which a video picture is blocked because a relatively large quantity of collapsed bullet-screen comments are displayed on the client at a time. The preset period may be a preset collapsed bullet-screen comment update period. For example, if the preset period is 10 seconds, the server delivers the collapsed bullet-screen comment every 10 seconds, to update the collapsed bullet-screen comment displayed on the client. The preset quantity may be set based on the size of the display screen of the client. For example, the preset quantity is 4 or 5. This is not limited in this embodiment of this application.

In an example, FIG. 3 is a schematic diagram of sorting result data. A bullet-screen comment text represents a collapsed bullet-screen comment delivered to the client, a quantity of times represents a quantity of homogeneous bullet-screen comments included in the collapsed bullet-screen comment, a start moment represents a time at which the collapsed bullet-screen comment starts to be displayed on the client, and an end moment represents a time at which display of the collapsed bullet-screen comment on the client ends. In FIG. 3, the preset period in which the server delivers the collapsed bullet-screen comment is 10 seconds, and the preset quantity is 3, that is, three collapsed bullet-screen comments are delivered every 10 seconds.

In this embodiment, when delivering the collapsed bullet-screen comment to the client, the server may further deliver the collapsed bullet-screen comment in a personalized manner based on a specific status of the client. Personalized delivery of the collapsed bullet-screen comment is reflected in the following three aspects: First, the collapsed bullet-screen comment cannot exist in a combo time period in terms of selection of a time window; second, priorities of all bullet-screen comment special effects are higher than a priority of the collapsed bullet-screen comment in terms of a priority; and finally, a shielded bullet-screen comment word of the user and the collapsed bullet-screen comment displayed on the client are mutually exclusive. In a personalized delivery process, a deliverable collapsed bullet-screen comment is calculated in real time based on an actual situation. In some embodiments of this application, the delivering a preset quantity of collapsed bullet-screen comments to the client based on a preset period and the sorting result includes:

determining whether a time window of the on-demand video is in a combo time period, and if the time window of the on-demand video is in the combo time period, waiting for the combo time period to end, and then delivering the preset quantity of collapsed bullet-screen comments to the client based on the preset period and the sorting result.

In this embodiment, when the time window of the on-demand video is in the combo time period, the collapsed bullet-screen comment cannot exist. It is determined whether the time window of the on-demand video is in the combo time period, and if the time window of the on-demand video is in the combo time period, end of the combo time period is waited, and then the preset quantity of collapsed bullet-screen comments are delivered to the client based on the preset period and the sorting result.

In some embodiments of this application, the delivering a preset quantity of collapsed bullet-screen comments to the client based on a preset period and the sorting result includes:

determining whether the collapsed bullet-screen comment can trigger a bullet-screen comment special effect, and if the collapsed bullet-screen comment can trigger a bullet-screen comment special effect, delivering the bullet-screen comment special effect to the client.

In this embodiment, priorities of all bullet-screen comment special effects are higher than a priority of the collapsed bullet-screen comment. When the server delivers the collapsed bullet-screen comment to the client, it is determined whether the collapsed bullet-screen comment can trigger a bullet-screen comment special effect. If the collapsed bullet-screen comment can trigger a bullet-screen comment special effect, the bullet-screen comment special effect is delivered to the client, to display the bullet-screen comment special effect on the client.

In some embodiments of this application, the delivering a preset quantity of collapsed bullet-screen comments to the client based on a preset period and the sorting result includes:

obtaining a user blocked word corresponding to the client, and removing a bullet-screen comment that includes the user blocked word from the collapsed bullet-screen comments, to obtain a deliverable collapsed bullet-screen comment; and delivering a preset quantity of deliverable collapsed bullet-screen comments to the client based on the preset period and the sorting result.

In this embodiment, the shielded bullet-screen comment word of the user and the collapsed bullet-screen comment displayed on the client are mutually exclusive. When delivering the collapsed bullet-screen comment to the client, the server obtains the user blocked word corresponding to the client, and removes the bullet-screen comment that includes the user blocked word from the collapsed bullet-screen comments, to obtain the deliverable collapsed bullet-screen comment; and delivers the preset quantity of deliverable collapsed bullet-screen comments to the client based on the preset period and the sorting result.

In some embodiments of this application, the method may further include the following steps:

obtaining an interactive operation for the collapsed bullet-screen comment; and adjusting interactive data corresponding to the interactive operation.

In this embodiment, the collapsed bullet-screen comment displayed on the client may further have a light interaction capability. The interactive operation for the collapsed bullet-screen comment is obtained, and then the interactive data corresponding to the interactive operation is adjusted. The interactive operation may include liking, copying, reporting, and a +1 operation. This is not limited in this embodiment of this application.

In some embodiments of this application, the method may further include the following step:

reporting the collapsed bullet-screen comment and related data of the collapsed bullet-screen comment to a preset data warehouse.

The related data of the collapsed bullet-screen comment may be generated based on a preset data structure, and the related data of the collapsed bullet-screen comment is reported to the preset data warehouse. For example, the related data of the collapsed bullet-screen comment includes a video type, a manuscript ID, a video ID, a collapsed bullet-screen comment text, a collapsed bullet-screen comment display number, a display start moment, a display end moment, and a collapsed bullet-screen comment generation time. The preset data warehouse may be Hive. The Hive is used to extract, convert, and load data. This is a mechanism for storing, querying, and analyzing large-scale data stored in Hadoop.

Figure 4:
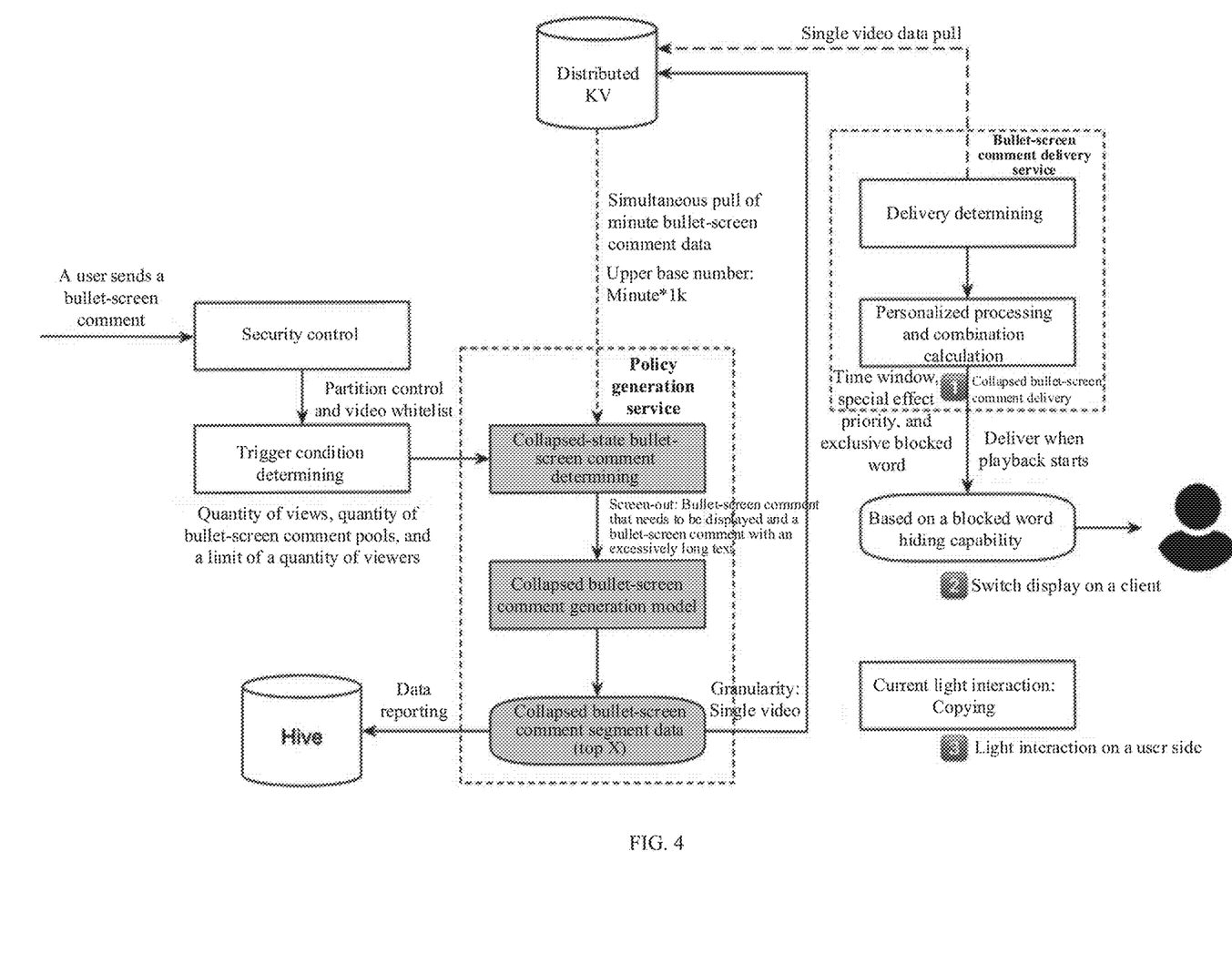
FIG. 4 is an example of a diagram of an architecture of a bullet-screen comment data processing system according to some embodiments of this application.

To further describe the bullet-screen comment data processing solution in the embodiments of this application, FIG.

4 is a diagram of an architecture of a bullet-screen comment data processing system. In FIG. 4, main logic of key means is as follows:

(1) Collapsed State Trigger Control

A collapsed bullet-screen comment exists only in a hot video. The hot video is determined based on a total quantity of views of the video and a quantity of bullet-screen comments in the video.

Trigger control includes partition control (refined to a level-2 partition), a video dimension whitelist (the collapsed bullet-screen comment is not generated in a video in the list), and a limitation of infrequent generation in a long tail period (a quantity of current viewers of a single video is limited).

(2) Collapsed Bullet-Screen Comment Generation

Source bullet-screen comment determining: An excessively long bullet-screen comment is not involved in collapsed calculation. A bullet-screen comment text length is less than or equal to 20 Chinese characters or 60 English characters. In addition, a highly liked bullet-screen comment, a protected bullet-screen comment, an NFT bullet-screen comment, an uploader bullet-screen comment, and an emoticon trigger bullet-screen comment are bullet-screen comments that need to be displayed, and these bullet-screen comments are not involved in calculation or generation of the collapsed bullet-screen comment.

Collapsed bullet-screen comment generation policy: A target collapsed bullet-screen comment is comprehensively calculated based on a full text of a bullet-screen comment on which review succeeds and with reference to video popularity data and a feature of the bullet-screen comment.

Collapsed bullet-screen comment segment data (sorting): Collapsed bullet-screen comments are sorted in a reverse order based on counts of the collapsed bullet-screen comments. If a basic threshold is reached, only top 10 collapsed bullet-screen comments are retained as valid data at a time.

(3) Collapsed Bullet-Screen Comment Storage

The collapsed bullet-screen comment is stored based on two granularities: a video granularity and a video segment granularity (X seconds is used as a basic unit).

A collapsed bullet-screen comment stored based on the video granularity includes all collapsed bullet-screen comments in a single video, and is used for personalized processing before the collapsed bullet-screen comment is delivered. In a collapsed bullet-screen comment stored based on the video segment granularity, X seconds is used as an independent segment. When a generation state of the collapsed bullet-screen comment is change update, only a collapsed bullet-screen comment in a video segment is recalculated. When a generation state of the collapsed bullet-screen comment is full update, collapsed bullet-screen comment data of all segments in a single video is newly created.

(4) Personalized Delivery

The collapsed bullet-screen comment is delivered by using a single video as a dimension. A quantity limitation is that an upper limit of a quantity of collapsed bullet-screen comments displayed on a single client is 3, and four collapsed bullet-screen comments are delivered at a time. A display side may display different quantities of collapsed bullet-screen comments based on different clients. Personalized delivery of the collapsed bullet-screen comment is reflected in the following three aspects: First, the collapsed bullet-screen comment cannot exist in a combo time period in terms of selection of a time window; second, priorities of all bullet-screen comment special effects are higher than a priority of the collapsed bullet-screen comment in terms of a priority; and finally, a shielded bullet-screen comment word of the user and the collapsed bullet-screen comment displayed on a screen are mutually exclusive. In a personalized delivery process, a deliverable collapsed bullet-screen comment is calculated in real time based on an actual situation.

(5) Light Interaction Capability

A user side may perform a light interactive operation with the collapsed bullet-screen comment, including liking, copying, reporting, and a +1 operation.

(6) Data Statistics Reporting

The collapsed bullet-screen comment is reported to a data warehouse (Hive), and includes a video type, a manuscript ID, a video ID, a collapsed bullet-screen comment text, a collapsed bullet-screen comment display number, a display start moment, a display end moment, and a collapsed bullet-screen comment generation time.

Figure 5:
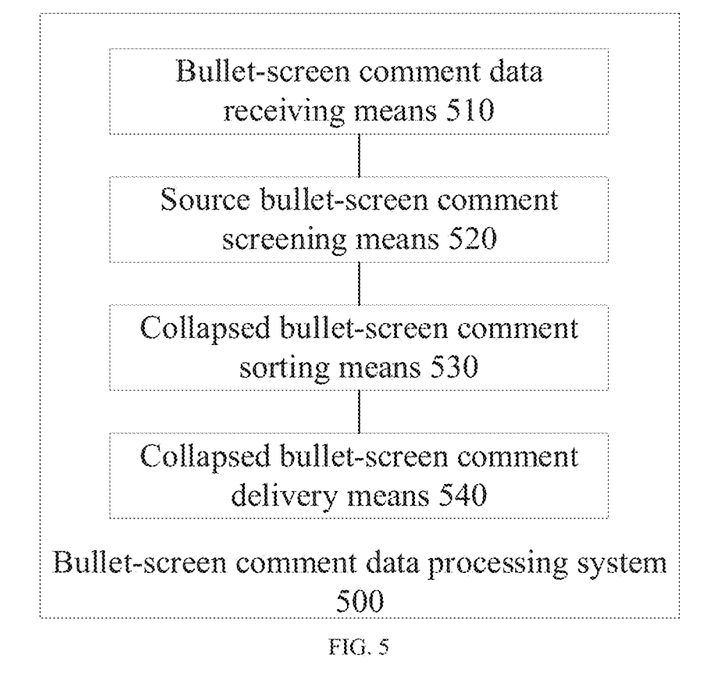
FIG. 5 is an example of a block diagram of a bullet-screen comment data processing apparatus according to some embodiments of this application.

FIG. 5 is an example of a block diagram of a bullet-screen comment data processing system according to some embodiments of this application. The bullet-screen comment data processing system may be divided into one or more program means. The one or more program means are stored in a storage medium, and are executed by one or more processors, to complete this embodiment of this application. The program means in this embodiment of this application is a series of computer-readable instruction segments that can be used to complete a specified function. The following describes a function of each program means in this embodiment of this application.

As shown in FIG. 5, the bullet-screen comment data processing system 500 may include the following means:
- a bullet-screen comment data receiving means 510, configured to receive bullet-screen comment data for an on-demand video played in a client;
- a source bullet-screen comment screening means 520, configured to: when the on-demand video meets a preset bullet-screen comment trigger condition, screen the bullet-screen comment data based on a preset rule, to obtain source bullet-screen comments;
- a collapsed bullet-screen comment sorting means 530, configured to: combine the source bullet-screen comments to generate collapsed bullet-screen comments used to represent homogenous bullet-screen comments, and sort the collapsed bullet-screen comments to obtain a sorting result; and
- a collapsed bullet-screen comment delivery means 540, configured to send the collapsed bullet-screen comments to the client based on the sorting result, to display the collapsed bullet-screen comments on a display screen of the client.

In some embodiments of this application, the system further includes:
- a playback data obtaining means, configured to obtain playback data corresponding to the on-demand video, where the playback data includes a total quantity of on-demand views and a total quantity of bullet-screen comments;
- a hot video determining means, configured to: if the total quantity of on-demand views is greater than a first preset value, and/or the total quantity of bullet-screen comments is greater than a second preset value, determine that the on-demand video is a hot video; and
- a preset bullet-screen comment trigger condition detection means, configured to: when the on-demand video is a hot video, detect whether the on-demand video meets the preset bullet-screen comment trigger condition.

In some embodiments of this application, the preset rule is used to obtain, through screening, bullet-screen comment data that meets a collapsed bullet-screen comment generation condition, and the preset rule includes:
- a length of the bullet-screen comment data is less than or equal to a third preset value;
- the bullet-screen comment data does not have a specified label; and
- the bullet-screen comment data cannot trigger an emoticon bullet-screen comment.

In some embodiments of this application, the specified label includes a highly liked bullet-screen comment label, a protected bullet-screen comment label, an NFT bullet-screen comment label, and an uploader bullet-screen comment label.

In some embodiments of this application, the collapsed bullet-screen comment sorting means 530 includes:
- a bullet-screen comment quantity counting sub-means, configured to count a first quantity of homogeneous bullet-screen comments included in each collapsed bullet-screen comment; and
- a collapsed bullet-screen comment sorting sub-means, configured to: when the first quantity is greater than or equal to a fourth preset value, sort the collapsed bullet-screen comments in a reverse order based on the first quantity, and retain a preset quantity of collapsed bullet-screen comments with high rankings, to obtain the sorting result.

In some embodiments of this application, the system further includes:
- a first bullet-screen comment storage means, configured to store the collapsed bullet-screen comment based on a video granularity; or
- a second bullet-screen comment storage means, configured to store the collapsed bullet-screen comment based on a video segment granularity.

In some embodiments of this application, the system further includes:
- a generation state obtaining means, configured to obtain a generation state corresponding to the collapsed bullet-screen comment; and
- a collapsed bullet-screen comment update means, configured to update the collapsed bullet-screen comment based on the generation state of the collapsed bullet-screen comment.

In some embodiments of this application, the collapsed bullet-screen comment update means includes:
- a first collapsed bullet-screen comment update means, configured to: when the generation state of the collapsed bullet-screen comment is change update, determine, based on a generation time corresponding to the collapsed bullet-screen comment that needs to be updated, a target video segment to which the collapsed bullet-screen comment that needs to be updated belongs, and recalculate a collapsed bullet-screen comment in the target video segment, to update the collapsed bullet-screen comment corresponding to the target video segment; or
- a second collapsed bullet-screen comment update means, configured to: when the generation state of the collapsed bullet-screen comment is full update, update collapsed bullet-screen comments corresponding to all video segments in the on-demand video.

In some embodiments of this application, the collapsed bullet-screen comment delivery means 540 includes:
- a collapsed bullet-screen comment delivery sub-means, configured to deliver a preset quantity of collapsed bullet-screen comments to the client based on a preset period and the sorting result.

In some embodiments of this application, the collapsed bullet-screen comment delivery sub-means includes:
- a first delivery unit, configured to: determine whether a time window of the on-demand video is in a combo time period, and if the time window of the on-demand video is in the combo time period, wait for the combo time period to end, and then deliver the preset quantity of collapsed bullet-screen comments to the client based on the preset period and the sorting result.

In some embodiments of this application, the collapsed bullet-screen comment delivery sub-means includes:
- a second delivery unit, configured to: determine whether the collapsed bullet-screen comment can trigger a bullet-screen comment special effect, and if the collapsed bullet-screen comment can trigger a bullet-screen comment special effect, deliver the bullet-screen comment special effect to the client.

In some embodiments of this application, the collapsed bullet-screen comment delivery sub-means includes:
- a bullet-screen comment removal unit, configured to: obtain a user blocked word corresponding to the client, and remove a bullet-screen comment that includes the user blocked word from the collapsed bullet-screen comments, to obtain a deliverable collapsed bullet-screen comment; and
- a third delivery unit, configured to deliver a preset quantity of deliverable collapsed bullet-screen comments to the client based on the preset period and the sorting result.

In some embodiments of this application, the system further includes:
- an interactive operation obtaining means, configured to obtain an interactive operation for the collapsed bullet-screen comment; and
- an interactive data adjustment means, configured to adjust interactive data corresponding to the interactive operation.

In some embodiments of this application, the system further includes:
- a collapsed bullet-screen comment reporting means, configured to report the collapsed bullet-screen comment and related data of the collapsed bullet-screen comment to a preset data warehouse.

Figure 6:
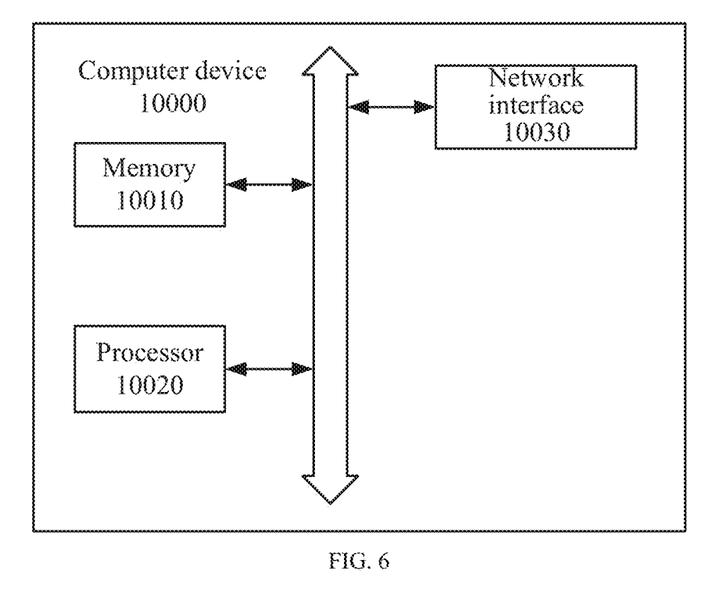
FIG. 6 is an example of a schematic diagram of a hardware architecture of a computer device suitable for implementing a bullet-screen comment data processing method according to some embodiments of this application.

FIG. 6 is an example of a schematic diagram of a hardware architecture of a computer device 10000 suitable for implementing a bullet-screen comment data processing method according to some embodiments of this application. In this embodiment, the computer device 10000 is a device that can automatically calculate a value and/or process information based on an instruction that is set or stored in advance. For example, the computer device 10000 may be a smartphone, a tablet computer, a notebook computer, a desktop computer, a rack server, a blade server, a tower server, or a cabinet server (including an independent server, or a server cluster including a plurality of servers). As shown in FIG. 6, the computer device 10000 at least includes but is not limited to a memory 10010, a processor 10020, and a network interface 10030 that can be communicatively connected to each other by using a system bus.

The memory 10010 includes at least one type of computer-readable storage medium. The readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the memory 10010 may be an internal storage means of the computer device 10000, for example, a hard disk or a memory of the computer device 10000. In some other embodiments, the memory 10010 may be an external storage device of the computer device 10000, for example, a removable hard disk, a smart media card (SMC), a secure digital (SD) card, or a flash card that is disposed on the computer device 10000. Certainly, the memory 10010 may include both an internal storage means of the computer device 10000 and an external storage device of the computer device 10000. In this embodiment, the memory 10010 is usually configured to store an operating system and various types of application software that are installed on the computer device 10000, for example, program code of the bullet-screen comment data processing method. In addition, the memory 10010 may be further configured to temporarily store various types of data that have been output or are to be output.

The processor 10020 may be a central processing unit (CPU), a controller, a microcontroller, a microprocessor, or another data processing chip in some embodiments. The processor 10020 is usually configured to control an overall operation of the computer device 10000, for example, perform control and processing related to data exchange or communication performed by the computer device 10000. In this embodiment, the processor 10020 is configured to run program code stored in the memory 10010 or process data.

The network interface 10030 may include a wireless network interface or a wired network interface, and the network interface 10030 is usually configured to establish a communication link between the computer device 10000 and another computer device. For example, the network interface 10030 is configured to: connect the computer device 10000 to an external terminal by using a network, and establish a data transmission channel, a communication link, and the like between the computer device 10000 and the external terminal. The network may be a wireless or wired network such as an intranet, the Internet, a global system for mobile communications (GSM), wideband code division multiple access (WCDMA), a 4G network, a 5G network, Bluetooth, or Wi-Fi.

It should be noted that FIG. 6 shows only a computer device with the components 10010 to 10030. However, it should be understood that implementation of all the shown components is not required, and more or fewer components may be alternatively implemented.

In this embodiment, the bullet-screen comment data processing method stored in the memory 10010 may be further divided into one or more program means to be executed by one or more processors (the processor 10020 in this embodiment), to complete this embodiment of this application.

Some embodiments of this application further provides a computer-readable storage medium. The computer-readable storage medium stores a computer program. When the computer program is executed by a processor, the steps of the bullet-screen comment data processing method in the embodiments are implemented.

In this embodiment, the computer-readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the computer-readable storage medium may be an internal storage unit of a computer device, for example, a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may include both an internal storage unit of the computer device and an external storage device of the computer device. In this embodiment, the computer-readable storage medium is usually configured to store an operating system and various types of application software that are installed on the computer device, for example, program code of the bullet-screen comment data processing method in the embodiments. In addition, the computer-readable storage medium may be further configured to temporarily store various types of data that have been output or are to be output.

Clearly, a person skilled in the art should understand that the foregoing means or steps in the embodiments of this application may be implemented by using a general computing apparatus. The means or steps may be integrated into a single computing apparatus or distributed in a network including a plurality of computing apparatuses. Optionally, the means or steps may be implemented by using program code that can be executed by the computing apparatus. Therefore, the means or steps may be stored in a storage apparatus for execution by the computing apparatus. In addition, in some cases, the shown or described steps may be performed in an order different from the order herein. Alternatively, the means or steps may be separately made into integrated circuit means, or a plurality of means or steps in the means or steps are made into a single integrated circuit means for implementation. In this way, a combination of any hardware and software is not limited in the embodiments of this application.

The foregoing descriptions are merely embodiments of this application, and are not intended to limit the scope of this application. Any equivalent structure or equivalent procedure change made based on the content of this specification and the accompanying drawings of this application is directly or indirectly applied to other related technical fields, and shall fall within the protection scope of this application.

What is claimed is:

1. A method, comprising:
   receiving, by a processor, bullet-screen comment data for an on-demand video played in a client;
   in response to determining that the on-demand video meets a preset bullet-screen comment trigger condition, screening, by a processor, the bullet-screen comment data based on a preset rule to obtain source bullet-screen comments;
   combining, by a processor, the source bullet-screen comments to dynamically generate collapsed bullet-screen comments representing homogenous bullet-screen comments and being not sent by a user, and sorting the collapsed bullet-screen comments to obtain a sorting result; and
   dynamically displaying, by the processor, a quantity of the collapsed bullet-screen comments on a display screen of the client in a new form different from that of the source bullet-screen comments based on the sorting result and a size of the display screen;

wherein the preset rule is used for screening bullet-screen comment data that meets a collapsed bullet-screen comment generation condition, and the preset rule comprises:
a length of the bullet-screen comment data is less than or equal to a third preset value;
the bullet-screen comment data does not have a specified label; and
the bullet-screen comment data cannot trigger an emoticon bullet-screen comment.

2. The method according to claim 1, further comprising: after receiving the bullet-screen comment data for the on-demand video played in the client,
obtaining playback data corresponding to the on-demand video, wherein the playback data comprises a total quantity of on-demand views and a total quantity of bullet-screen comments;
in response to determining that the total quantity of on-demand views is greater than a first preset value, and/or the total quantity of bullet-screen comments is greater than a second preset value, determining the on-demand video as a hot video; and
in response to determining that the on-demand video is a hot video, detecting whether the on-demand video meets the preset bullet-screen comment trigger condition.

3. The method according to claim 1, wherein the specified label comprises a highly liked bullet-screen comment label, a protected bullet-screen comment label, an NFT bullet-screen comment label, and an uploader bullet-screen comment label.

4. The method according to claim 1, wherein sorting the collapsed bullet-screen comments to obtain the sorting result comprises:
counting a first quantity of homogeneous bullet-screen comments included in each collapsed bullet-screen comment; and
in response to determining that the first quantity is greater than or equal to a fourth preset value, sorting the collapsed bullet-screen comments in a reverse order based on the first quantity, and retaining a preset quantity of collapsed bullet-screen comments with high rankings to obtain the sorting result.

5. The method according to claim 1, further comprising:
storing the collapsed bullet-screen comment based on a video granularity; or
storing the collapsed bullet-screen comment based on a video segment granularity.

6. The method according to claim 5, further comprising:
obtaining a generation state corresponding to the collapsed bullet-screen comment; and
updating the collapsed bullet-screen comment based on the generation state of the collapsed bullet-screen comment.

7. The method according to claim 6, wherein updating the collapsed bullet-screen comment based on the generation state of the collapsed bullet-screen comment comprises:
in response to determining that the generation state of the collapsed bullet-screen comment is change update, determining, based on a generation time corresponding to the collapsed bullet-screen comment that needs to be updated, a target video segment to which the collapsed bullet-screen comment that needs to be updated belongs, and recalculating a collapsed bullet-screen comment in the target video segment to update the collapsed bullet-screen comment corresponding to the target video segment; or in response to determining that the generation state of the collapsed bullet-screen comment is full update, updating the collapsed bullet-screen comments corresponding to all video segments of the on-demand video.

8. The method according to claim 1, wherein sending the collapsed bullet-screen comments to the client based on the sorting result comprises:
delivering a preset quantity of collapsed bullet-screen comments to the client based on a preset period and the sorting result.

9. The method according to claim 8, wherein delivering the preset quantity of collapsed bullet-screen comments to the client based on the preset period and the sorting result comprises:
in response to determining that a time window of the on-demand video is in a combo time period, waiting for the combo time period to end, and delivering the preset quantity of collapsed bullet-screen comments to the client based on the preset period and the sorting result.

10. The method according to claim 8, wherein delivering the preset quantity of collapsed bullet-screen comments to the client based on the preset period and the sorting result comprises:
in response to determining that the collapsed bullet-screen comment can trigger a bullet-screen comment special effect, delivering the bullet-screen comment special effect to the client.

11. The method according to claim 8, wherein delivering the preset quantity of collapsed bullet-screen comments to the client based on the preset period and the sorting result comprises:
obtaining a user blocked word corresponding to the client, and removing a bullet-screen comment that comprises the user blocked word from the collapsed bullet-screen comments to obtain a deliverable collapsed bullet-screen comment; and
delivering the preset quantity of the deliverable collapsed bullet-screen comments to the client based on the preset period and the sorting result.

12. The method according to claim 1, further comprising:
obtaining an interactive operation for the collapsed bullet-screen comment; and
adjusting interactive data corresponding to the interactive operation.

13. The method according to claim 1, further comprising:
reporting the collapsed bullet-screen comment and data related to the collapsed bullet-screen comment to a preset data warehouse.

14. A computer device, comprising:
a processor, and
a memory, wherein the memory stores computer programs executable on the processor that, when executed by the processor, cause the processor to:
receive bullet-screen comment data for an on-demand video played in a client;
screen, in response to determining that the on-demand video meets a preset bullet-screen comment trigger condition, the bullet-screen comment data based on a preset rule to obtain source bullet-screen comments;
combine the source bullet-screen comments to dynamically generate collapsed bullet-screen comments representing homogenous bullet-screen comments and being not sent by a user, and sort the collapsed bullet-screen comments to obtain a sorting result; and dynamically display a quantity of the collapsed bullet-screen comments on a display screen of the client in a new form different from that of the source bullet-screen comments based on the sorting result and a size of the display screen,
wherein the preset rule is used for screening bullet-screen comment data that meets a collapsed bullet-screen comment generation condition, and the preset rule comprises:
a length of the bullet-screen comment data is less than or equal to a third preset value;
the bullet-screen comment data does not have a specified label; and
the bullet-screen comment data cannot trigger an emoticon bullet-screen comment.

15. The computer device according to claim 14, wherein the computer programs further cause the processor to: after receiving the bullet-screen comment data for the on-demand video played in the client,
obtain playback data corresponding to the on-demand video, wherein the playback data comprises a total quantity of on-demand views and a total quantity of bullet-screen comments;
determine, in response to determining that the total quantity of on-demand views is greater than a first preset value, and/or the total quantity of bullet-screen comments is greater than a second preset value, the on-demand video as a hot video; and
detect, in response to determining that the on-demand video is a hot video, whether the on-demand video meets the preset bullet-screen comment trigger condition.

16. The computer device according to claim 14, wherein the specified label comprises a highly liked bullet-screen comment label, a protected bullet-screen comment label, an NFT bullet-screen comment label, and an uploader bullet-screen comment label.

17. The computer device according to claim 14, wherein sorting the collapsed bullet-screen comments to obtain the sorting result comprises:

counting a first quantity of homogeneous bullet-screen comments included in each collapsed bullet-screen comment; and
in response to determining that the first quantity is greater than or equal to a fourth preset value, sorting the collapsed bullet-screen comments in a reverse order based on the first quantity, and retaining a preset quantity of collapsed bullet-screen comments with high rankings to obtain the sorting result.

18. A non-transitory computer-readable storage medium storing a computer program that, when executed by at least one processor, cause the at least one processor to:
receive bullet-screen comment data for an on-demand video played in a client;
screen, in response to determining that the on-demand video meets a preset bullet-screen comment trigger condition, the bullet-screen comment data based on a preset rule to obtain source bullet-screen comments;
combine the source bullet-screen comments to dynamically generate collapsed bullet-screen comments representing homogenous bullet-screen comments and being not sent by a user, and sort the collapsed bullet-screen comments to obtain a sorting result; and
dynamically displaying a quantity of the collapsed bullet-screen comments on a display screen of the client in a new form different from that of the source bullet-screen comments based on the sorting result and a size of the display screen,
wherein the preset rule is used for screening bullet-screen comment data that meets a collapsed bullet-screen comment generation condition, and the preset rule comprises:
a length of the bullet-screen comment data is less than or equal to a third preset value;
the bullet-screen comment data does not have a specified label; and
the bullet-screen comment data cannot trigger an emoticon bullet-screen comment.

* * * * *